US008439422B2

(12) United States Patent
Ricks, Jr.

(10) Patent No.: US 8,439,422 B2
(45) Date of Patent: May 14, 2013

(54) TARP WITH MULTIPLE ATTACHMENT POINTS

(76) Inventor: Stephen G. Ricks, Jr., Metairie, LA (US)

( * ) Notice: Subject to any disclaimer, the term of this patent is extended or adjusted under 35 U.S.C. 154(b) by 1189 days.

(21) Appl. No.: 11/321,388

(22) Filed: Dec. 28, 2005

(65) Prior Publication Data

US 2006/0273615 A1  Dec. 7, 2006

Related U.S. Application Data

(60) Provisional application No. 60/687,492, filed on Jun. 3, 2005.

(51) Int. Cl.
*B60J 11/00* (2006.01)
(52) U.S. Cl.
USPC .......................................................... 296/98
(58) Field of Classification Search ............... 296/98, 296/100.01, 100.11
See application file for complete search history.

(56) References Cited

U.S. PATENT DOCUMENTS

| 2,455,237 | A | 11/1948 | Davis |
| 3,467,999 | A | 9/1969 | Bjorksten et al. |
| 3,949,527 | A | 4/1976 | Double et al. |
| 3,987,592 | A | 10/1976 | Herminghaus et al. |
| 4,413,029 | A | 11/1983 | Handwerker |
| 4,590,715 | A | 5/1986 | Pandell |
| 4,742,602 | A | 5/1988 | Horner |
| 5,050,924 | A | 9/1991 | Hansen |
| 5,111,554 | A | 5/1992 | Sweers |
| 5,240,756 | A | 8/1993 | Finell et al. |
| 5,328,310 | A * | 7/1994 | Lockney ................... 410/97 |
| 5,363,605 | A | 11/1994 | Handwerker |
| 5,388,702 | A | 2/1995 | Jones |
| 5,497,819 | A * | 3/1996 | Chiang .................... 150/166 |
| 5,763,031 | A | 6/1998 | Huang |
| 5,772,369 | A | 6/1998 | Lerman et al. |
| 5,974,740 | A | 11/1999 | Park |
| 6,017,174 | A | 1/2000 | Ross et al. |
| 6,224,139 | B1 | 5/2001 | Weyand |
| 6,439,815 | B1 | 8/2002 | Liu |
| 6,474,022 | B1 | 11/2002 | Double et al. |
| 6,715,820 | B1 * | 4/2004 | Haas ..................... 296/136.1 |
| 6,783,312 | B2 * | 8/2004 | Smith ........................ 410/97 |
| 6,851,903 | B1 | 2/2005 | Foggy |
| 7,070,373 | B2 | 7/2006 | Brown |
| 2004/0051336 | A1 * | 3/2004 | Chiao et al. .............. 296/78.1 |
| 2005/0249568 | A1 | 11/2005 | Gormly et al. |

* cited by examiner

*Primary Examiner* — H Gutman
(74) *Attorney, Agent, or Firm* — Garvey, Smith, Nehrbass & North, L.L.C.; Brett A. North

(57) ABSTRACT

What is provided is a new and innovative multiple attachment point tarpaulin and method that enables the tarpaulin to be flexibly connected at multiple attachment points, and more securely fastening of the tarpaulin. The present invention achieves the above advantages and benefits by having multiple attachment points at strategic locations.

2 Claims, 7 Drawing Sheets

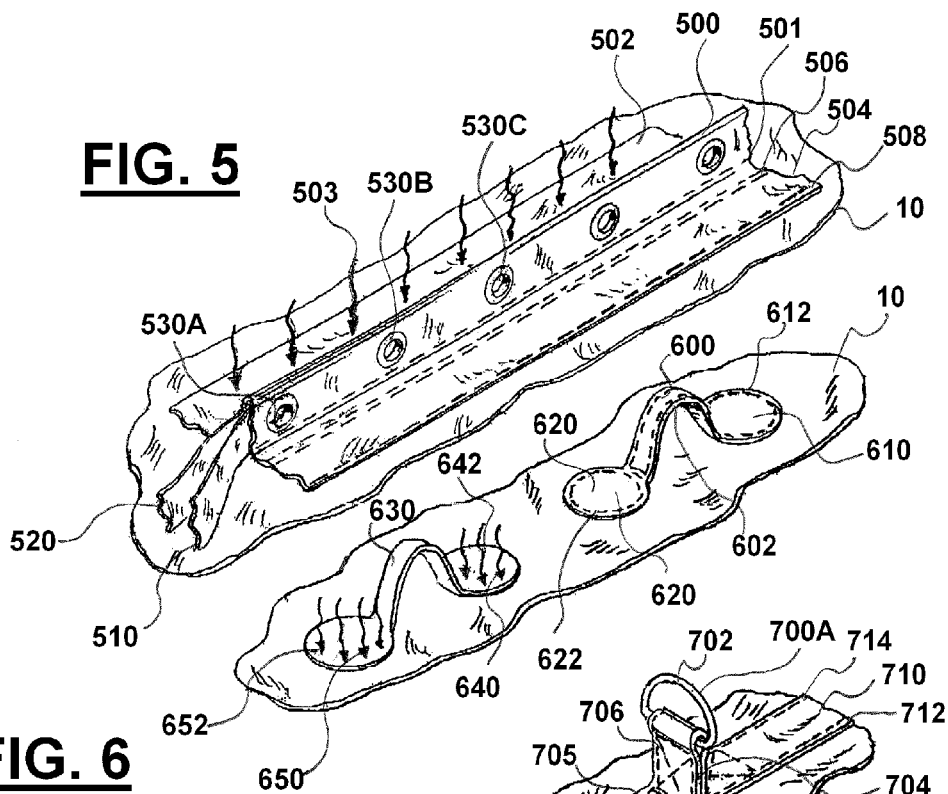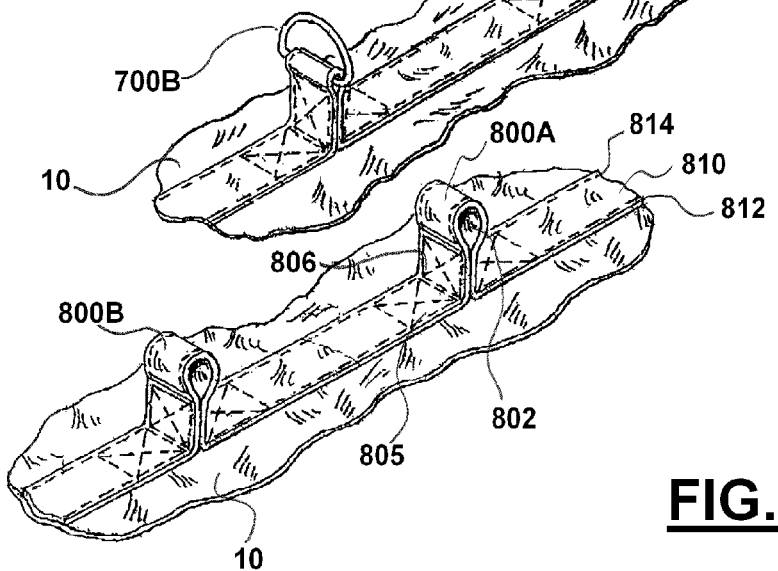

TARP WITH MULTIPLE ATTACHMENT POINTS

CROSS-REFERENCE TO RELATED APPLICATIONS

Priority is claimed to U.S. provisional patent application Ser. No. 60/687,492, filed Jun. 3, 2005.

U.S. provisional patent application Ser. No. 60/687,492, filed Jun. 3, 2005 is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

This invention relates to a new and innovative tarpaulin with multiple attachment points that enables the tarpaulin to be flexible regarding its various points of attachment allowing more secured fastening of the tarpaulin with respect to different load configurations, sizes, and shapes. The present invention may be made of fabric, plastic-coated woven fabric, fleece or of unreinforced or reinforced edges and sides.

Tarpaulins are used as covers for protecting all types of materials against the influences of weather, cold, heat, dust and other harsh environments. In the prior art tarpaulins are used mainly for covering purposes. They are often made in a shaped form after being cut to a pattern. They may be provided with reinforcements, eyelets (or tie points) and other holding devices, for use as covers on trucks, cars, boats, protective covers on construction jobs, on railroads and for mail traffic, as well as for many other purposes. Tarpaulins which are provided with eyelets, supporting strips or other fastening means, have become very important in the construction industry where they serve to protect against weather, particularly during rainy, cold, and/or dusty days.

There are two drawbacks to conventional tarpaulins. The first is that conventional tarpaulins come in fixed sizes, so that even though a given tarpaulin might be ideal to be used for covering a certain item, the same tarpaulin would be either too large or too small to cover another item which is considerably larger or smaller. The second problem occurs when conventional tarpaulins are used in very windy areas, they were often tearing because these tarpaulins did not provide sufficient pull strength. Basically, too much stress was put on each fastening point, because the tarpaulins were pulled only from one angle.

In connection with the first problem, users of conventional tarpaulins were required to purchase several different sizes to accommodate different sized items. In connection with the second problem, the tarpaulins were damaged easily, mainly due to large rips starting from a small cut around reinforcements, due to too much stress around the reinforcements.

For the foregoing reasons, there is a need for a new and innovative flexible tarpaulin that enables the tarpaulin to be connected at multiple points to accommodate different sizes of items to be protected or covered and a tarpaulin which can distribute the load to multiple points at strategic locations so that stress will be controllable at the tie down points. Multiple points of attachment provide the flexibility of allowing the tarpaulin to be effectively "shortened" or "enlarged" as needed based on the particular load size by choosing particular attachment points which "fit" the load size.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided is a new and innovative multiple attachment point tarpaulin that enables the tarpaulin to be flexibly connected at multiple attachment points, and more securely fastening of the tarpaulin. The present invention achieves the above advantages and benefits by having multiple attachment points at strategic locations.

In one embodiment the attachment points can be located along a plurality of intersecting non-parallel lines.

In another embodiment the attachment points can be located along non-intersecting parallel lines.

In another embodiment the attachment points can be located along concentric figures, such as circles or ellipses.

In another embodiment the attachment points can be symmetrically or irregularly positioned on the tarpaulin.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a partial perspective view of one embodiment of multiple attachment points.

FIG. 6 is a partial perspective view of another embodiment of multiple attachment points.

FIG. 7 is a is a partial perspective view of another embodiment of multiple attachment points.

FIG. 8 is a partial perspective view of another embodiment of multiple attachment points.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
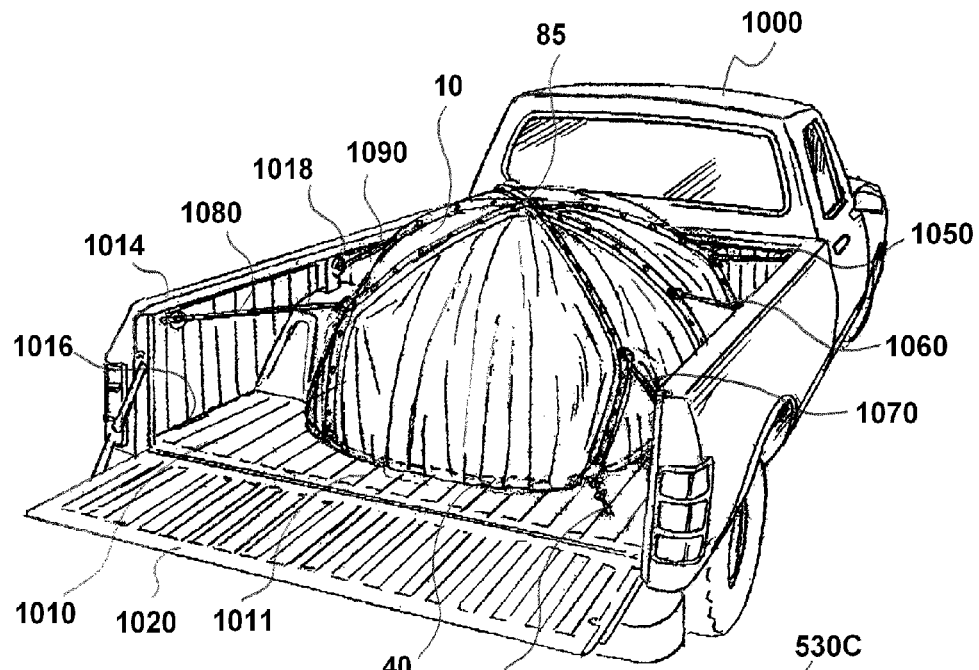
FIG. 1 a perspective of a tarpaulin with multiple attachment points in a vehicle.
Figure 1A:
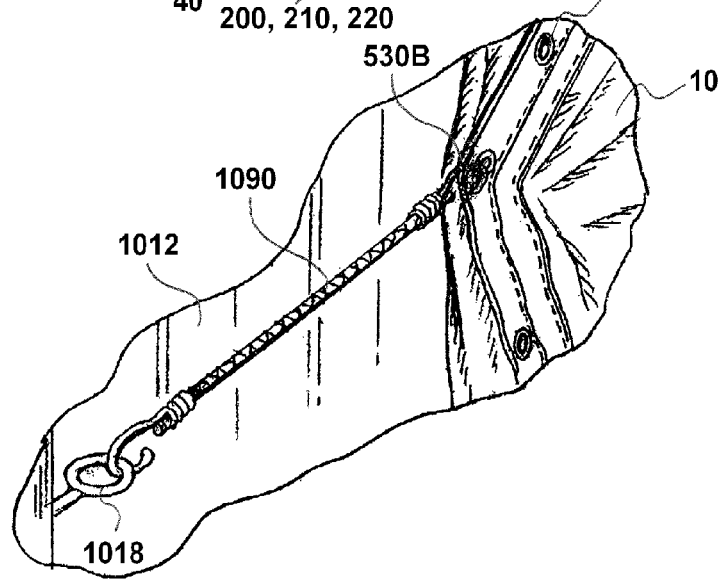
FIG. 1A is a close-up of one of the connectors for the tarpaulin in FIG. 1.

FIG. 1 a perspective of a tarpaulin 10 with multiple attachment points in a vehicle 1000. Tarp 10 is attached to truck 1000 through a plurality of connectors 1050,1060,1070,1080,1090, etc. These connectors can be any conventionally available connectors such as bungie type connectors. FIG. 1A is a close up of tarp 10 showing connector 1090 attached to truck 1000 through attachment point 1018 and grommet 530B. Attachment point 1018 can be located at any point on side wall 1012, even next to floor 1016. Additionally, attachment point 1018 can be located above side wall 1012 or even on floor 1016.

Truck 1000 can include bed 1010. Bed 1010 can include floor 1011, plurality of sidewalls 1012, and tailgate 1020. Each sidewall can include a bottom 1016 and top 1014.

In FIG. 1 tarp 10 is shown covering and protecting a load 1005. Load 1005 can be any load such as mud, equipment, devices, etc. which is to be covered or protected from the weather. As shown in FIG. 1, tarp 10 can be provided with a drawstring 200 at its perimeter, which drawstring can be used to secure tarp 10 around load 1005.

Also in FIG. 1, at least a portion of tarp 10 (e.g., center 85) is shown as being in a position above the top 1014 of sidewalls 1012 and another portion of tarp 10 (e.g., perimeter 40 is shown being located below the top 1014 of sidewalls 1012. Preferably, greater than fifty percent of perimeter 40 is located below the top 1014 of sidewalls 1012. More preferably, perimeter 40 is located next to bed 1010. Bed 1010 is preferably attached to the bottom 1016 of sidewalls 1012. Also preferably, drawstring 200 is used to tighten tarp 10 around load 1005. Preferably, drawstring 200 is located next to bed 1010. In an alternative embodiment, multiple connectors (e.g., 1050A, 1050B, etc.) can be used on multiple attachment points which attachment points are organized in a particular line.

Figures 2, 2A:
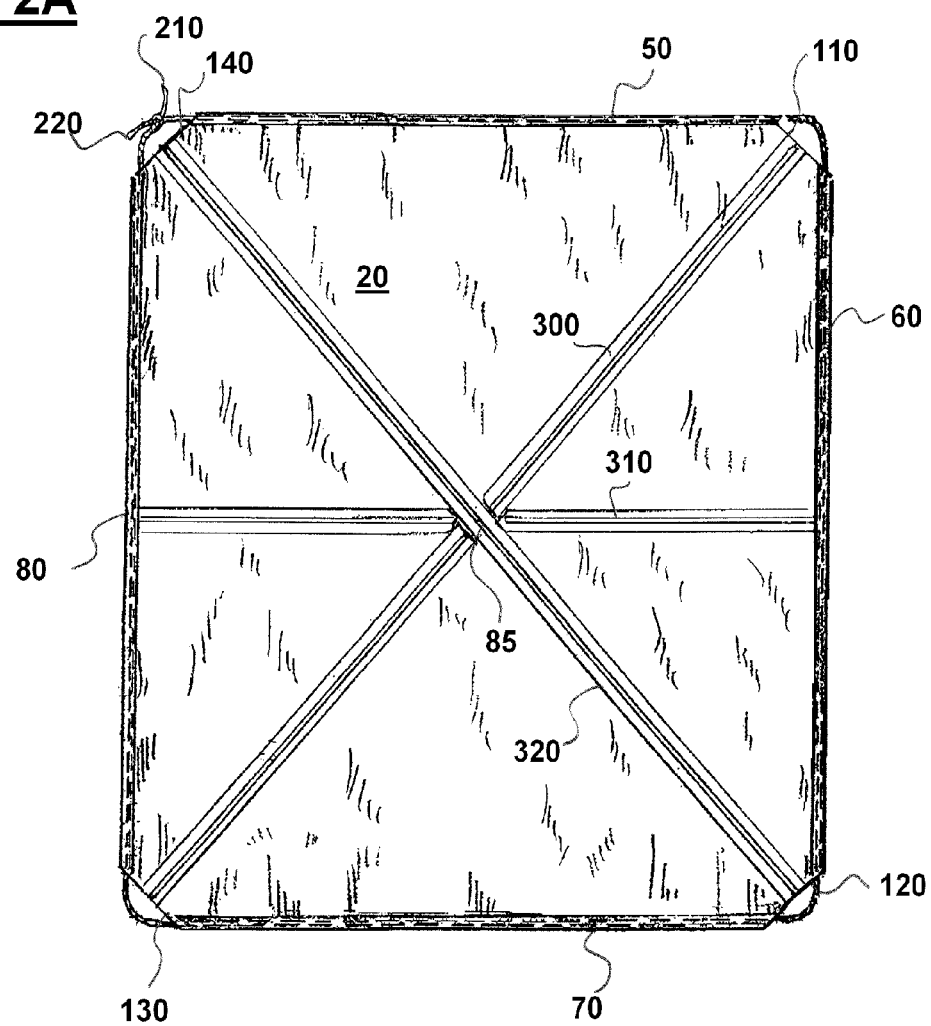
FIG. 2 is a top view of the tarp of FIG. 1.
FIG. 2A is a schematic diagram schematically indicating that the ends of the drawstring are connected by a frictional connector, hook-and-look fastener, strap, or buckle.

FIG. 2 is a top view of tarp 10 shown FIG. 1. Tarp 10 can have a top 20 and bottom 30. Tarp 10 is shown being of a rectangular shape having sides 50,60,70,80, which sides form perimeter 40. Tarp 10 is also shown having drawstring 200 located around its perimeter 40. Draw string 200 is shown exposed at the four corners 110,120,130,140. At corner 140 drawstring 200 includes ends 210,220 which are tied together. Other fastening means besides tying can be used such as frictional or slide connectors. On top 20 is shown a plurality of attachments points organized in lines (300,310, 320). Various different forms of attachment points can be used such as those shown in FIGS. 5 through 8. The embodiment disclosed in FIG. 5 is shown as the preferred embodiment for attachment points. In any of the embodiments an attachment point can be located at the geometric center of tarp 10.

Drawstring 200 can be any conventionally available drawstring. It can be a cord, chain, string, rope, wire, thread, tape, and strap. Drawing string 200 can include tightening devices such as frictional connector, velcro connectors, strap and buckle.

Lines 300,310,320 are shown as straight lines which intersect at center 85 of tarp 10, which is preferred. However, additional lines (beyond 300,310,320) can be used. Furthermore, one or more of the lines are not required to intersect. One objective is to provide multiple attachment points to accommodate a plurality of loads. Different shapes of lines can be used, such as "H" shape, triangular, elliptical, circular, trapezoidal, polygonal, etc.

Although tarp 10 is shown as being rectangular. Alternative shapes can be used such as square, circular, triangular, trapezoidal, and polygonal.

Figure 3:
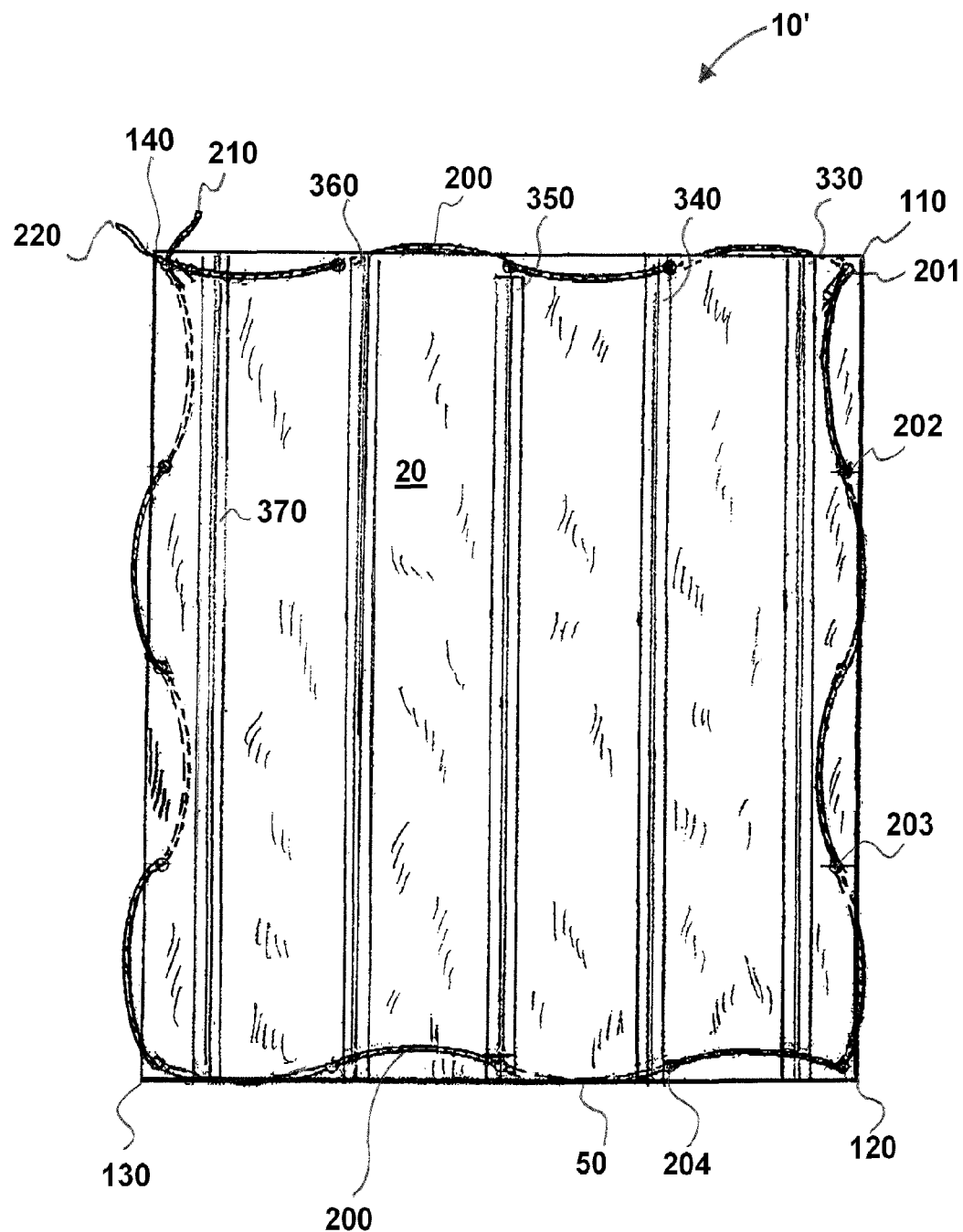
FIG. 3 is a top view of an alternative tarp.

FIG. 3 is a top view of an alternative tarp 10'. This tarp includes a plurality of parallel and non-intersecting lines 330, 340,350,360, and 370 along which attachment points are organized. Although the lines are shown being parallel, non-parallel lines can be used which may not intersect, or which may intersect. More or less lines can be used than as shown in FIG. 3. Also in tarp 10' drawstring 200 is shown as being "threaded" through perimeter 50 via a plurality of openings 201,202,203,204, etc. Although threading of draw string 200 is shown, threading is not preferred as it allows drawstring 200 to catch or snag on items.

Figure 4A:
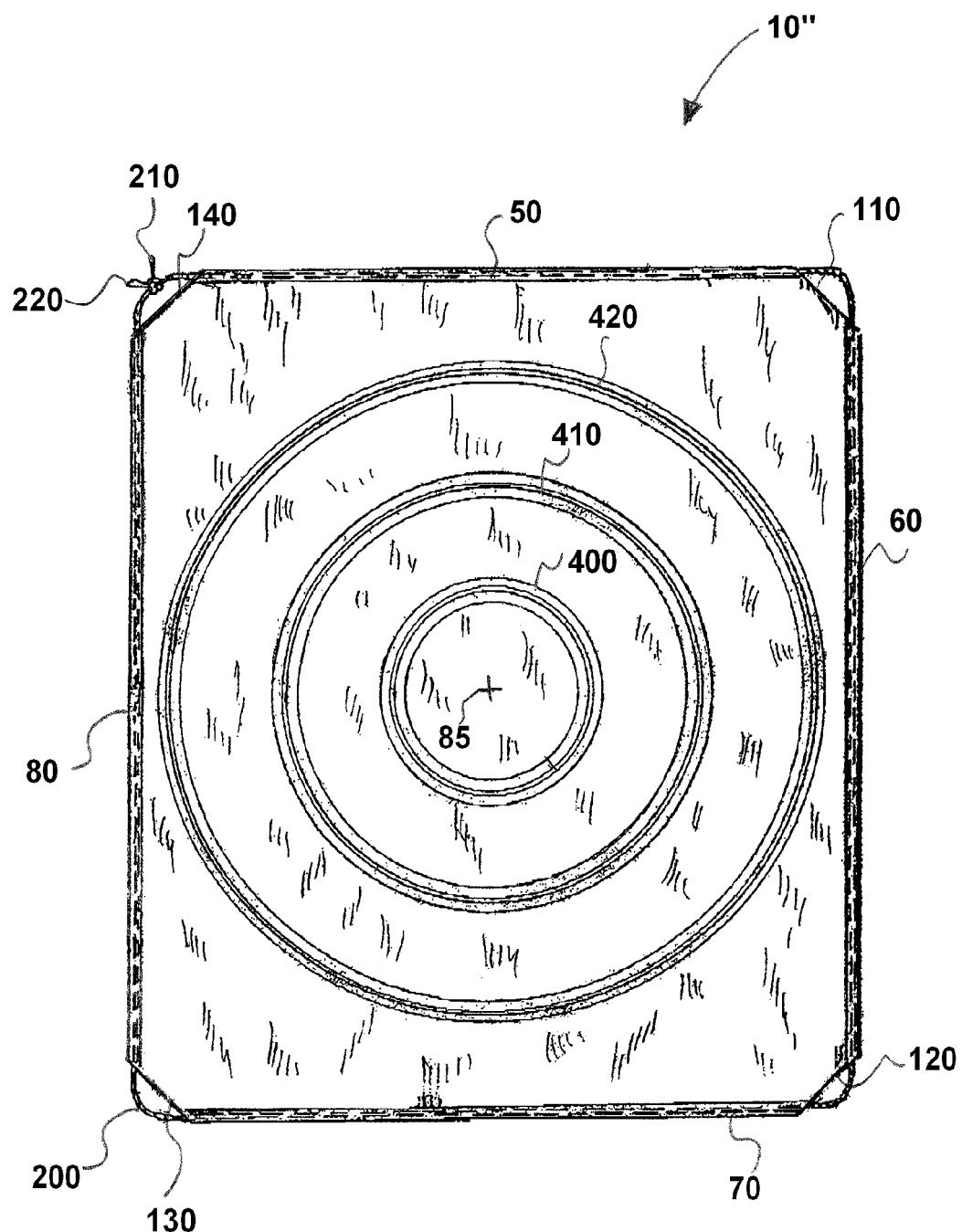
FIGS. 4A and 4B are a top views alternative tarps.

FIG. 4A is a top view of another alternative tarp 10". In tarp 10" a plurality of concentric rings (400,410,420) are shown around center 85. More rings can be used to increase the flexibility of having multiple attachment points.

Figure 4B:
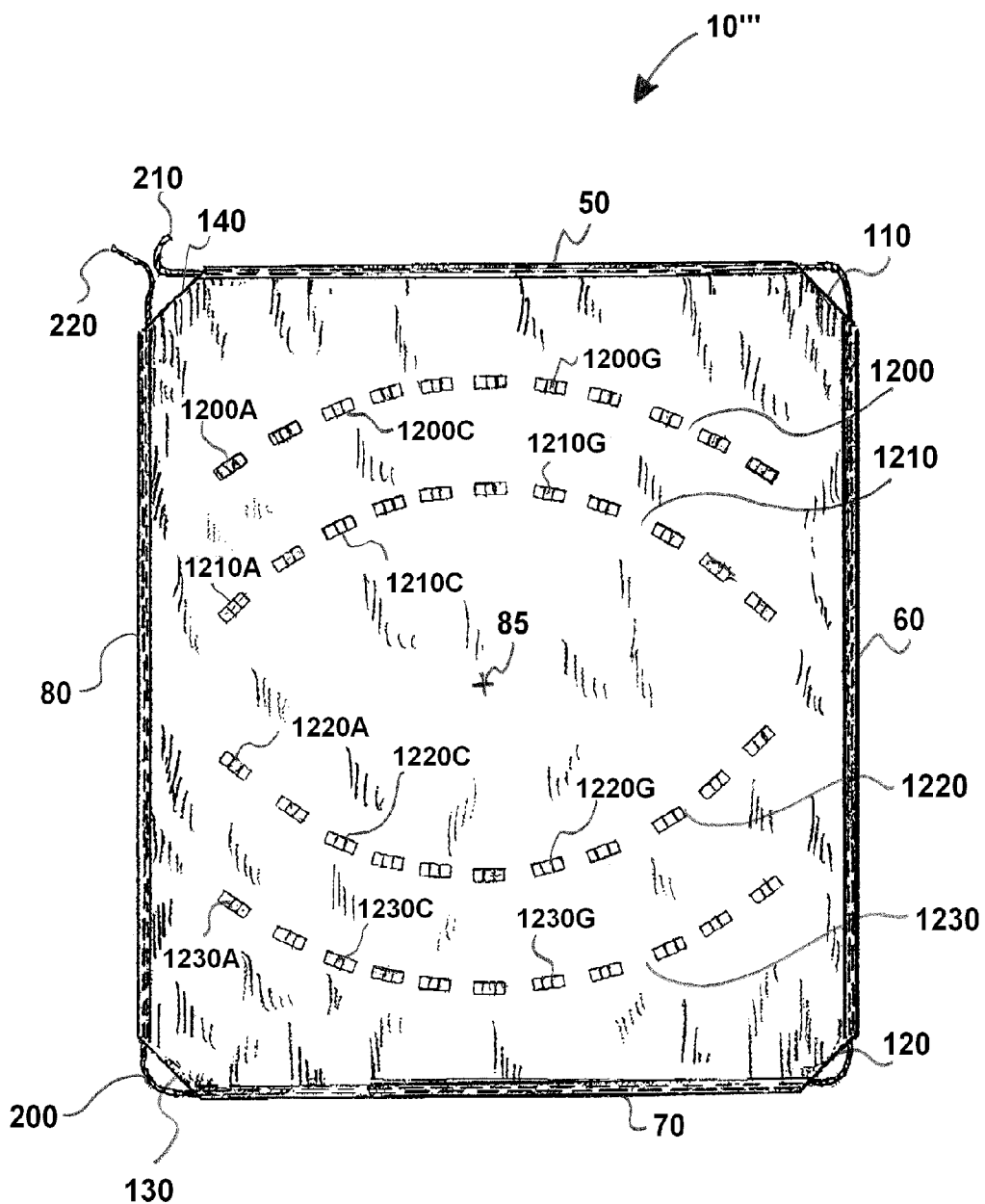
Figure 9:
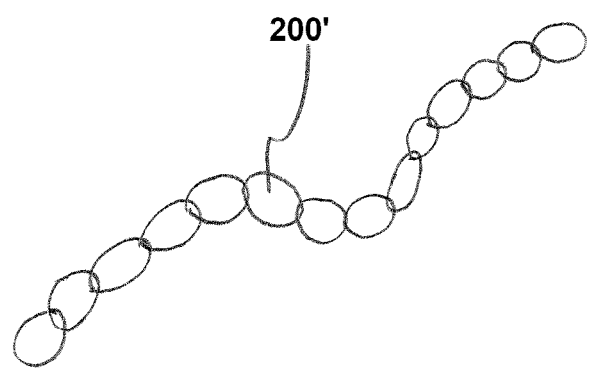
FIG. 9 is a schematic diagram of a chain which can be used as a draw string.

FIG. 4B is a top view of another alternative tarp 10'''. In tarp 10''' a plurality of attachment point configurations (1200, 1210,1220,1230) are shown symmetrically spaced about center 85. Each attachment point configuration (e.g., 1200) can include a plurality of attachment points (e.g., 1200A, 1200C, 1200G, etc.). Additional attachment point configurations can be used to increase the flexibility of having multiple attachment points. Furthermore, one or more attachment point configurations (e.g., 1210) can be irregularly shaped and/or non-symmetrically spaced about center 85. Additionally, one or more attachment point configurations (e.g., 1220) can intersect one or more other attachment point configurations.

FIG. 5 is a partial perspective view of a ridge 500 having multiple attachment points 530A,530B,530C, etc. Reinforcing grommets can be included at the multiple attachment points. Ridge 50 can include upper 502 and lower 504 sides. Ridge 500 can be attached to tarp 10 by stitching or adhesive or heat bonding. Alternatively ridge 500 can be integral with tarp 10. On lower 504 side stitching 508 is shown. On upper 502 side heat bonding 503 is used. Stitching 506 and 501 is shown as reinforcement regardless of the means of attachment. Also shown is reinforcing strips 510,520. Additionally, both stitching and heat bonding can be used.

FIG. 6 is a partial perspective view of another embodiment of multiple attachment loops 600,630. Only two attachment loops are shown for clarity, however, numerous attachment points can be used. Attachment loop 600 can comprise base 610 and base 630. Stitching 612 can be used to attach base 610 to tarp 10. Stitching 622 can be used to attach base 620 to tarp. Stitching 602 can be used to reinforce loop 600. Attachment loop 630 is shown as being heat bonded to tarp 10 through base 640 and 650 (as indicated by heat arrows 642,652). Alternative methods of attachment for attachment loops can be used. Additionally, both stitching and heat bonding can be used.

FIG. 7 is a is a partial perspective view of another embodiment of multiple attachment points 700A,700B located along strip 710. Each attachment point can include a ring 702 and attachment strip 704. Only two attachment points are shown for clarity, however, numerous attachment points can be used. Stitching 712,714 can be used to attach strip 710 to tarp 10. Reinforcing stitching 705,706 can also be used to reinforce each attachment point. Although not shown strip 710 can be heat bonded to tarp 10. Alternative methods of attachment for attachment points can be used. Additionally, both stitching and heat bonding can be used.

FIG. 8 is a partial perspective view of another embodiment of multiple attachment points 800A,800B located along strip 810. Each attachment point can include a loop 802. Only two attachment points are shown for clarity, however, numerous attachment points can be used. Stitching 812,814 can be used to attach strip 810 to tarp 10. Reinforcing stitching 805,806 can also be used to reinforce each attachment point. Although not shown strip 810 can be heat bonded to tarp 10. Alternative methods of attachment for attachment points can be used. Additionally, both stitching and heat bonding can be used.

The following is a list of reference numerals:

| LIST FOR REFERENCE NUMERALS | |
|---|---|
| (Reference No.) | (Description) |
| 10 | tarp |
| 20 | top |
| 30 | bottom |
| 40 | perimeter |
| 50 | side |
| 60 | side |
| 70 | side |
| 80 | side |
| 85 | center |
| 110 | corner |
| 120 | corner |
| 130 | corner |
| 140 | corner |
| 200 | drawstring |
| 210 | end of drawstring |
| 220 | end of drawstring |
| 300 | line |
| 310 | line |
| 320 | line |
| 330 | line |
| 340 | line |
| 350 | line |
| 360 | line |
| 370 | line |
| 380 | line |
| 400 | circle |
| 410 | circle |
| 420 | circle |
| 500 | ridge |
| 501 | stitching |
| 502 | side |
| 503 | plurality of heat arrows |
| 504 | side |
| 506 | stitching |
| 508 | stitching |
| 510 | reinforcing strip |
| 520 | reinforcing strip |
| 530 | grommet |
| 550 | stitching |
| 560 | stitching |
| 570 | adhesive |
| 600 | attachment loop |
| 602 | stitching |
| 610 | base |
| 612 | stitching |
| 620 | base |
| 622 | stitching |
| 630 | attachment loop |
| 640 | base |
| 642 | plurality of heat arrows |
| 650 | base |
| 652 | plurality of heat arrows |
| 700 | attachment ring |
| 705 | stitching |
| 706 | stitching |
| 710 | reinforcement |
| 712 | stitching |
| 714 | stitching |
| 800 | attachment loop |
| 802 | loop |
| 805 | stitching |

-continued

| LIST FOR REFERENCE NUMERALS | |
|---|---|
| (Reference No.) | (Description) |
| 806 | stitching |
| 810 | reinforcement |
| 812 | stitching |
| 814 | stitching |
| 1000 | vehicle |
| 1005 | load |
| 1010 | bed |
| 1011 | floor |
| 1012 | sidewalls |
| 1014 | top of sidewall |
| 1016 | bottom of sidewall |
| 1018 | connection point |
| 1020 | tailgate |
| 1050 | connector |
| 1060 | connector |
| 1070 | connector |
| 1080 | connector |
| 1090 | connector |
| 1100 | connector |
| 1200 | attachment point configuration |
| 1210 | attachment point configuration |
| 1220 | attachment point configuration |
| 1230 | attachment point configuration |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What I claim is:

1. A tarpaulin comprising:
   a) a substantially flat, flexible tarpaulin body;
   b) at least first, second and third lines intersecting across the tarpaulin body;
   c) a plurality of attachment points, formed in at least the first, second, and third intersecting lines for connecting the tarpaulin body to a remote connection point from each attachment point;
   d) a drawstring operatively connected to the tarpaulin around the perimeter of the tarpaulin, so that when the tarpaulin is placed over a load to be protected, the drawstring allows the tarpaulin to constrict around a bottom of the load and the attachment points engage each to the connection points to maintain the tarpaulin in place around the load;
   wherein each line includes a ridge, each ridge having a plurality of openings.

2. A tarpaulin comprising:
   a) a flat, flexible tarpaulin body to cover a load to be protected, the body including a perimeter having an interior, and a plurality of attachment points, the attachment points formed in five parallel lines, the lines being located on the interior of the perimeter so that each attachment point can be connected each to a remote connection point;

b) a drawstring operatively connected to the tarpaulin around the perimeter of the tarpaulin to draw the perimeter of the tarpaulin around a bottom of the load to be protected;

wherein each line includes a ridge, each ridge having a plurality of openings.

* * * * *